Feb. 1, 1944.   I. GHERTMAN   2,340,741
ACCOUNTING MACHINE
Filed June 4, 1941   7 Sheets-Sheet 1

INVENTOR
Ioins Ghertman
BY
ATTORNEY

Feb. 1, 1944.  I. GHERTMAN  2,340,741
ACCOUNTING MACHINE
Filed June 4, 1941  7 Sheets-Sheet 3

INVENTOR
Isino Ghertman
BY
ATTORNEY

Feb. 1, 1944.                I. GHERTMAN                2,340,741
                         ACCOUNTING MACHINE
                         Filed June 4, 1941        7 Sheets-Sheet 4

FIG.8.

| CYCLE | DATE | ACC.A | ACC.B | |
|---|---|---|---|---|
| ENTRY | 1 | 9999 (-1) | 0000 | (ENTRY SUPPRESSED) |
| ENTRY | 1 | 1 (+1) | 9999 (-1) | |
| ENTRY | 1 | 9999 (-1) | 1 (+1) | |
| ENTRY | 3 | 3 (+3) | 9997 (-3) | MINOR GROUP CHANGE |
| | | 0002 | 9997 | |
| PRINT & RESET | | 0000 | 9997 | |
| ENTRY | 3 | 9997 (-3) | 3 (+3) | |
| ENTRY | 4 | 4 (+4) | 9996 (-4) | MINOR GROUP CHANGE |
| | | 0001 | 9996 | |
| PRINT & RESET | | 0000 | 9996 | |
| ENTRY | 5 | 9995 (-5) | 5 (+5) | MINOR GROUP CHANGE |
| | | 9995 | 0001 | |
| PRINT & RESET | | 9995 | 0000 | |
| ENTRY | 5 | 5 (+5) | 9995 (-5) | |
| ENTRY | 27 | 9973 (-27) | 27 (+27) | MINOR GROUP CHANGE |
| | | 9973 | 0022 | |
| PRINT & RESET | | 9973 | 0000 | |
| ENTRY | 27 | 27 (+27) | 9973 (-27) | |
| ENTRY | 27 | 9973 (-27) | 27 (+27) | |
| ENTRY | 27 | 27 (+27) | 9973 (-27) | |
| ENTRY | 30 | 9970 (-30) | 30 (+30) | MINOR GROUP CHANGE |
| | | 9970 | 0003 | |
| PRINT & RESET | | 9970 | 0000 | |

INVENTOR
*Isino Ghertman*
BY
*W. M. Wilson*
ATTORNEY

FIG.9a.

Patented Feb. 1, 1944

2,340,741

UNITED STATES PATENT OFFICE 2,340,741

ACCOUNTING MACHINE

Ioino Ghertman, St. Mande, France, assignor to International Business Machines Corporation, New York, N. Y., a corporation of New York Application June 4, 1941, Serial No. 396,627
In France June 4, 1940

2 Claims. (Cl. 235—61.8)

This invention relates to accounting machines and particularly to accounting machines of the record controlled type.

The principal object of the invention is to provide an improved mechanism for use in connection with accounting machines employed in handling bank problems. It is the practice in certain banks to prepare a perforated record card for each transaction that takes place between the bank and a customer. Upon such record may be entered the customer's account number, the date of the transaction, the amount, and an indication as to whether the transaction is to be credited or debited to the account. Over a selected accounting period which may be a month, a quarter or other part of a year, there will be assembled for each account number a group of cards arranged in order of their dates and from this group of cards various reports are prepared. Machines have been devised for control by such cards, of which that shown in copending application Serial No. 383,914, of George F. Daly, filed March 18, 1941, is an example. In such machine, mechanism is provided for obtaining the difference of the number of days between transaction dates. Thus, if a transaction occurs on date 1 and no further transaction occurs until date 15, the machine obtains the difference 14 which controls the machine accordingly.

It is an object of the present invention to provide an improved mechanism for obtaining the difference in date numbers between successively sensed record cards, regardless of whether there is one or more cards having the same date number.

A more specific object of the invention is to provide a mechanism which will obtain the difference in date numbers without requiring any additional cycles of operation in the machine.

Other objects of the invention will be pointed out in the following description and claims and illustrated in the accompanying drawings, which disclose, by way of example, the principle of the invention and the best mode, which has been contemplated, of applying that principle.

The mechanical structure of the machine is similar to that shown and described in Patent 2,126,621, granted to G. F. Daly on August 9, 1938.

Card feeding mechanism

Figures 1, 1A, 2:
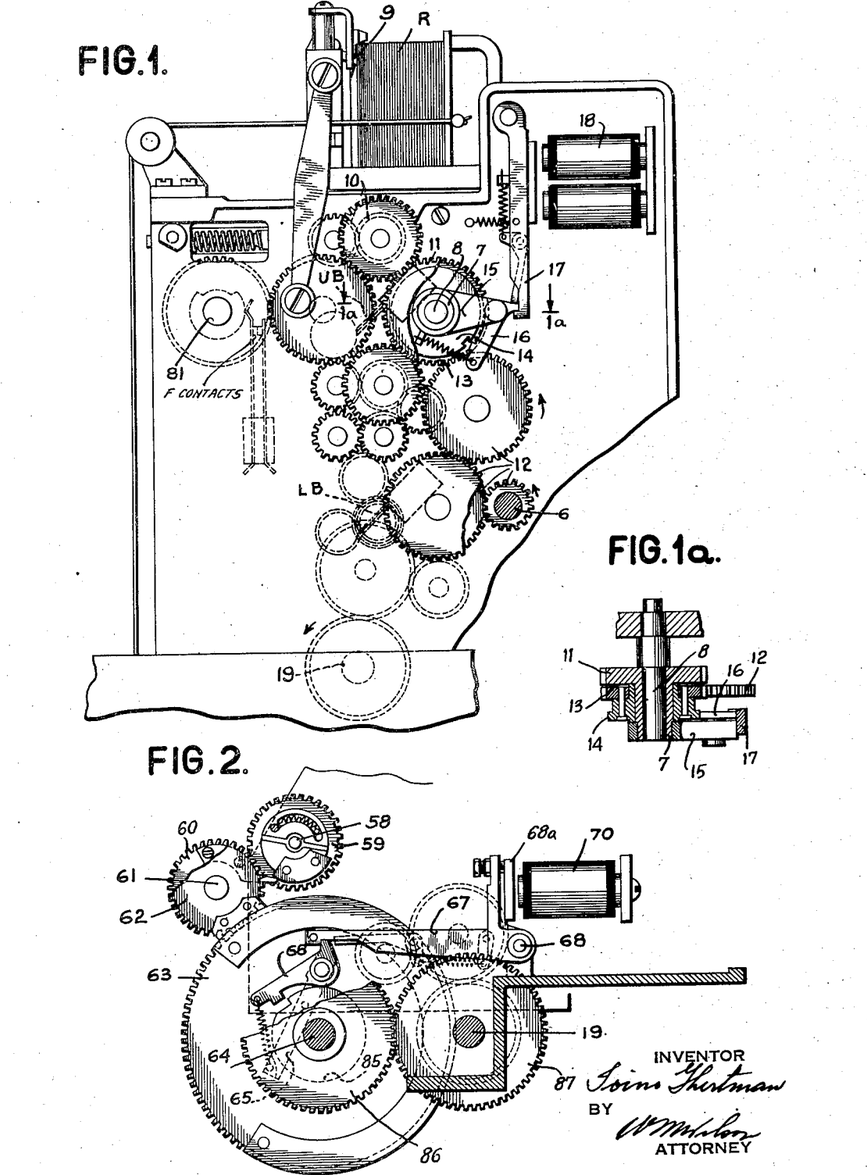
Fig. 1 is an outside view of the card feeding and analyzing mechanism.
Fig. 1a is a detail section on line 1a—1a of Fig. 1.
Fig. 2 is a detail view of the controlling devices of the accumulator resetting mechanism.

The card feeding mechanism shown in Fig. 1 is exactly similar to that shown and described in the patent referred to. The record cards R are fed from the magazine, one by one, downwardly by a picker 9 to pairs of feed rollers 10 which serve to advance the cards past upper and lower brushes UB and LB in succession. The shafts upon which rollers 10 are mounted are provided with gears at their extremities arranged as shown in Fig. 1 for operation by a main driving gear 11 which is freely mounted upon a shaft 8 and which has connection with an arm 15 through a sleeve 7 (see Fig. 1a). Arm 15 carries spring pressed clutching dog 16 normally held in the position shown by an armature latch 17 which is adapted to be controlled by the clutch magnet 18. Between gear 11 and arm 15 are a gear 13 and a clutch driving disk 14 freely rotatable upon the sleeve 7. Gear 13 has gear connection generally designated 12 with the pulley shaft 6 which is in operation as long as the main driving motor is operated. Energization of magnet 18 will trip dog 16 into engagement with disk 14, and the card feeding mechanism will cause cards to be advanced past the brushes UB and LB and feeding operations will continue as long as magnet 18 remains energized. During total taking cycles of operation, magnet 18 is deenergized and card feeding will, of course, not take place during such cycles.

Printing mechanism

The machine is also provided with printing mechanism which is exactly the same as that shown in the Daly patent. The same will, therefore, not be described in detail herein, except to note that the magnets 36 shown in Fig. 9b correspond to the same numbered magnets in the patent, and upon energization these magnets will control the position of the type bars in the same manner as in the patent.

Accumulating mechanism

The machine is provided with a number of accumulators similar to those shown and described in the Daly patent. For the purposes of the present invention, two accumulators of the so-called "direct subtraction type" are provided. These accumulators are the same in construction as those shown in Patent 1,976,617, granted to C. D. Lake et al. on October 9, 1934. For the purposes of the present invention, these accumulators may be limited to four denominational orders each, and the description thereof will be limited to a brief explanation of their manner of operation.

Figures 3, 4:
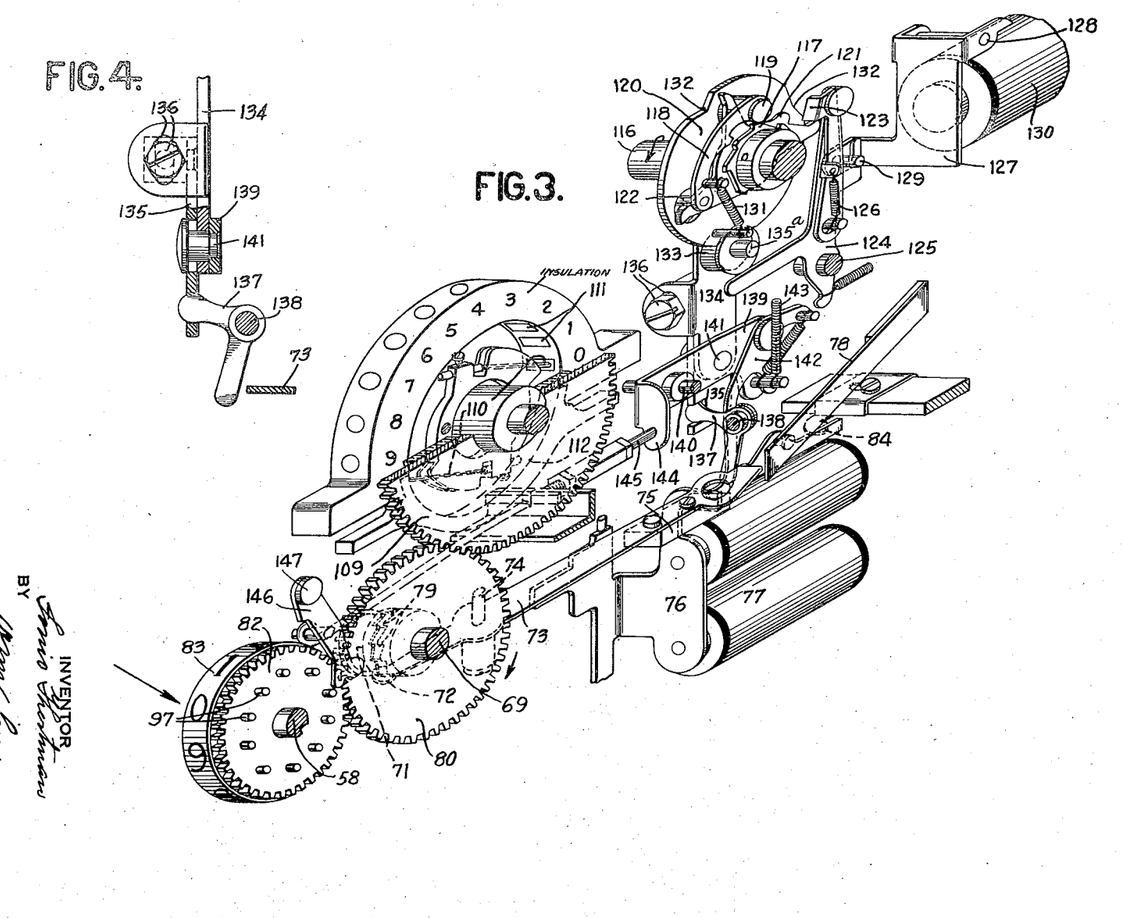
Fig. 3 is an isometric view of one denominational order of an accumulator.
Fig. 4 is a detail of parts shown in Fig. 3.

Referring to Fig. 3, the drive shaft 69 is directly geared to pulley shaft 6 of Fig. 1 so that it is in operation as long as the driving motor of the machine functions, and the drive ratio is such that shaft 69 makes one revolution for each card feeding cycle of the machine. Shaft 69 has slidably mounted thereon but keyed for rotation therewith a clutch element 71, one for each denominational order of the accumulator. The element 71 is provided with a groove in which fits the end of the short arm of lever 73 which is pivoted at 74 as shown and provided with a block 75 normally held as in Fig. 3 by armature latch 76 of adding magnet 77.

A leaf spring 78 bears against the extremity of the long arm of lever 73 and moves the same in counterclockwise direction upon release of block 75 by armature 76. This movement will bring clutching member 71 into engagement with co-operating teeth 79, integral with a gear 80 loosely mounted on shaft 69. Gear 80, when thus coupled to shaft 69, will rotate a gear 82 which meshes therewith and will displace the accumulator index wheel 83. The rearward extremity of lever 73 is adapted to be engaged by a finger 84 toward the end of the cycle for the purpose of disengaging clutch element 71 from teeth 79 and relatching block 75 on armature 76.

Briefly summarizing the adding operation, the magnet 77 may be energized at various points in the cycle of the machine depending upon the location of a perforation in the column of the record card analyzed by the sensing brushes. This energization may take place in response to a perforation in any of the index point positions from 9 to 1 inclusive. A perforation in the 9 index point position will trip the clutch element 71 nine steps before finger 84 is operated to de-energize it, and a perforation in the 1 index point position will trip the clutch element 71 one step before it is deenergized by the finger 84. Each step of clutching engagement corresponds to a tenth of a revolution of the accumulator index wheel 83, so that a 9 hole will move it nine-tenths of a revolution and a 1 hole will move it one-tenth of a revolution. The manner in which circuits through the sensing brushes control the operation of the magnet 77 will be set forth in connection with the explanation of the circuit diagram.

Readout mechanism

Also driven by gear 80 (Fig. 3) is a gear 109. Since the ratio of gears 109 and 80 is 2:1, the former will turn through a half revolution for each revolution of the latter. Carried by and insulated from gear 109 is a pair of electrically connected brushes 110, one of which cooperates successively with ten conducting segments 111, while the other cooperates with an arcuate conducting strip 112. The relationship of the parts is such that, when the index wheel 83 is in its zero position, one of the brushes 110 is in contact with the zero segment 111 and the other brush is in contact with the strip 112, thus forming an electrical connection between the two. The positioning of the brushes 110 provides a convenient electrical readout mechanism for controlling total printing operations, and the electrical circuits involved in these functions will be more fully explained in connection with the circuit diagram.

Subtracting mechanism

For the purpose of the present invention, two of the accumulators are provided with subtracting mechanism of well known construction, whereby entries may be made in the form of complements. Such mechanism is fully shown and described in Patent 1,976,617, and its operation will, therefore, be but briefly explained in connection with Fig. 3.

In the operation of substraction, the entry of the 9 complement of the number to be subtracted is effected by initially tripping all the adding magnets 77 as though to add 9 in each position, and causing the perforation in the record card to declutch the adding mechanism in accordance with the location of the perforation. This will result in the addition of the 9 complement of the number.

Secured to shaft 116 are a plurality of clutch elements 117, one for each denominational order position of the accumulator, and cooperating with each element is a clutching dog 118 pivoted at 119 to a cam 120 freely mounted on shaft 116. Also freely mounted on the shaft is a triple arm member 121, one of whose arms engages a pin 122 in the free end of dog 118 to hold the latter out of engagement with the driving element 117. Each of the arms of member 121 is adapted to cooperate in turn with a pawl 123 which is carried by clutch element 124 pivoted at 125. The pawl 123 is resiliently mounted on element 124 through spring and pin connection 126. A magnet armature 127 is pivoted at 128 and has a pin 129 in a laterally extending arm thereof, which is adapted upon energization of subtracting magnet 130 to rock element 124 in a clockwise direction to release member 121, thereby permitting spring 131 to rock the element in counterclockwise direction through pin 122, at the same time permitting the engagement of dog 118 with the driving element 117. The cam 120 will thus be driven in a counter-clockwise direction until the next arm of member 121 is engaged by pawl 123, which then causes disengagement of the clutch and interruption of further movement of the cam. The cam 120 is provided with three notches 132 about its periphery into which roller 133 rises successively. Upon the initial movement of cam 120, the higher concentric portion of cam 120 will depress roller 133 and with it slider 134 upon which the roller is pivoted. A pin 135a extending axially from roller 133 engages a horizontal arm of element 124 to cause the positive restoration of clutch pawl 123 and armature 127, immediately after the clutching action. Slider 134 (see also Fig. 4) has adjustably connected thereto a slider 135 which is vertically positionable with respect to slider 134, as by pin and slot connection 136. The lower extremity of slider 135 is provided with a notch into which the horizontal arm of bell crank 137 is fitted. The bell crank is pivoted at 138, and its depending arm lies adjacent to the edge of a clutch arm 73, so that the downward movement of slider 137 will cause the bell crank 137 to engage and move arm 73 in a declutching direction at a time determined by the time of energization of magnet 130 which is controlled by circuits extending through the sensing brushes.

It is desirable at the time of declutching of the adding mechanism to cause the positive restoration of the armature 76 of magnet 77 which ordinarily would not be positively restored until the end of the cycle. This is effected through an arm 139 pivoted at 140 and having connection with the slider 134 through a stud 141. Arm 139 carries a spring pressed pivoted finger 142 whose downwardly extending portion is adapted to engage the armature 76 and move it away from its magnet 77. A spring 143 is provided to move arm 139 and incidentally slider 134 upwardly after they have been depressed. Arm 139 is also provided with an offset finger 144 which engages a horizontally slidable rod 145 whose opposite end is connected through a pin to a finger 146 pivoted at 147. The free end of finger 146 lies in the path of pins 97, and the finger will be moved into cooperation with one of the pins 97 at the time that declutching is effected as just described. This will prevent overthrowing of the index wheel 83 which might otherwise take place due to the high speed at which this mechanism is operated. In Fig. 3 the shaft 116 has such driving connection through usual gearing (not shown) with shaft 69 that shaft 116 makes two revolutions for one revolution of shaft 69.

Elusive one

During certain subtracting operations, it is necessary to add a so-called "fugitive" or "elusive" one into the units order of an accumulator. This is effected by means of well known mechanism shown in Fig. 7 where the units order index wheel 83 has associated therewith a magnet 53 whose armature 54 is secured to the carry lever latch 55 of the units order, so that energization of magnet 53 will trip the units pawl carrying arm 56 whereby during the carrying portion of the machine cycle the pawl 57 associated with the units order will advance the units index wheel 83 one step.

Accumulator resetting mechanism

The shaft 58 (Fig. 3) upon which the index wheels 83 of an accumulator are loosely mounted is slotted for cooperation with spring pressed pawls (not shown) pivoted upon and carried by the individual index wheels in such manner that counterclockwise rotation of shaft 58 will engage and drive the index wheels 83 forwardly to zero position during a single revolution of shaft 58.

Referring to Fig. 2, shaft 58 carries a gear 59 at its extremity which is in engagement with gear 60 mounted upon reset shaft 61. At the extremity of shaft 61 is a gear 62 which is adapted to be driven by an intermittent gear 63 which is secured to shaft 64. Also fixed to shaft 64 is an arm 65 which carries spring pressed clutch dog 66 normally held in the position shown in Fig. 2 by a latching arm 67 supported by armature shaft 68 of magnet armature 68a.

Energization of magnet 70 will release dog 66 for engagement with clutch driving element 85. Element 85 is integral with a gear 86 which meshes with a gear 87 secured upon constantly running shaft 19. With this arrangement drive element 85 is in constant rotation and, whenever it is desired to effect resetting of the accumulators, magnet 70 is energized to provide a connection between the element 85 and the resetting shaft 61. The period during which shaft 64 rotates is called a "total taking cycle" or "total and reset cycle," during the first half of which total printing takes place and during the second half actual resetting of the accumulators occurs. The shaft 61 may be selectively coupled to the accumulator reset gear 60 by means of the usual so-called "zero button magnet" or may be manually coupled and locked thereto. The usual devices for effecting such action are shown in Fig. 8 of Patent 1,976,617 referred to.

Circuit control devices

The machine is provided with a number of circuit closing devices which are shown in the circuit diagram where they are prefixed in the customary manner by the letter F, L and P, the prefix F denoting that such devices are operated during card feeding cycles and are controlled from cams on a shaft which operates during card feeding operations, preferably the shaft 81 (Fig. 1). The contact devices prefixed L are operative during all cycles and are preferably controlled by cams on shaft 19 (Fig. 2). The devices prefixed P operate during total and reset cycles and are controlled by cams on shaft 64 which operates only during such cycles.

General explanation of the circuit diagram

Figures 6, 7:
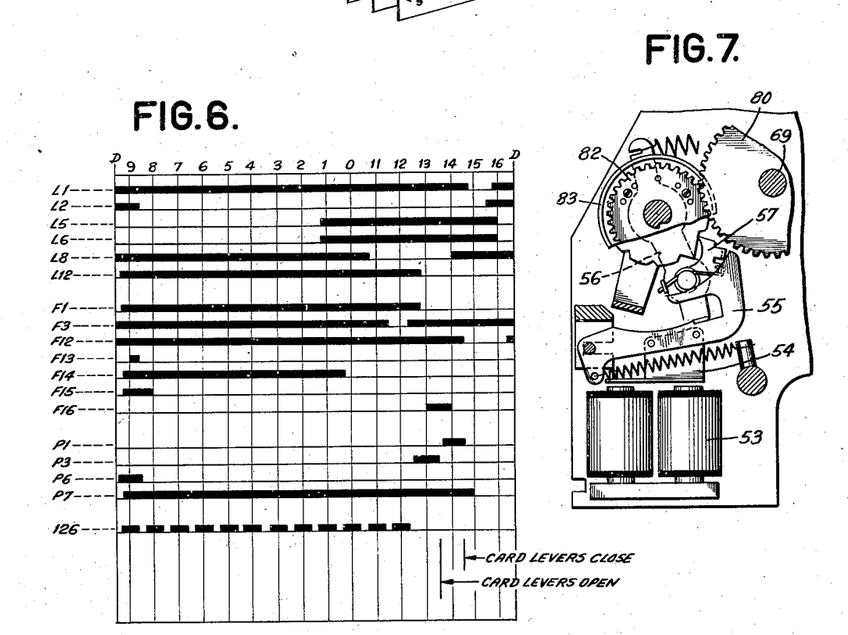
Fig. 6 is a timing diagram of the various cam controlled contact devices of the machine.
Fig. 7 is a detail view of the units order of an accumulator showing the mechanism for entering the "elusive one" during subtracting operations.
Figure 9:
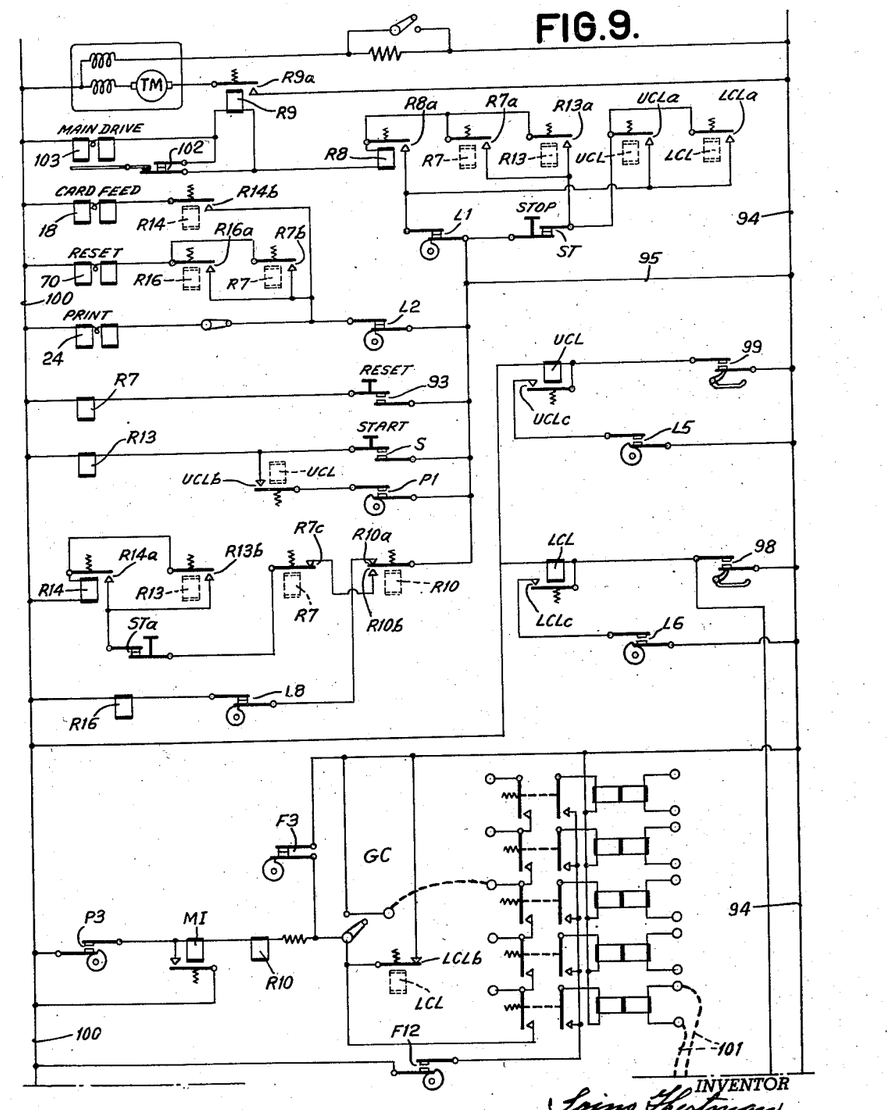
Figs. 9, 9a and 9b taken together in the order named comprise a wiring diagram of the electric circuits of the machine.
Figure 9A:
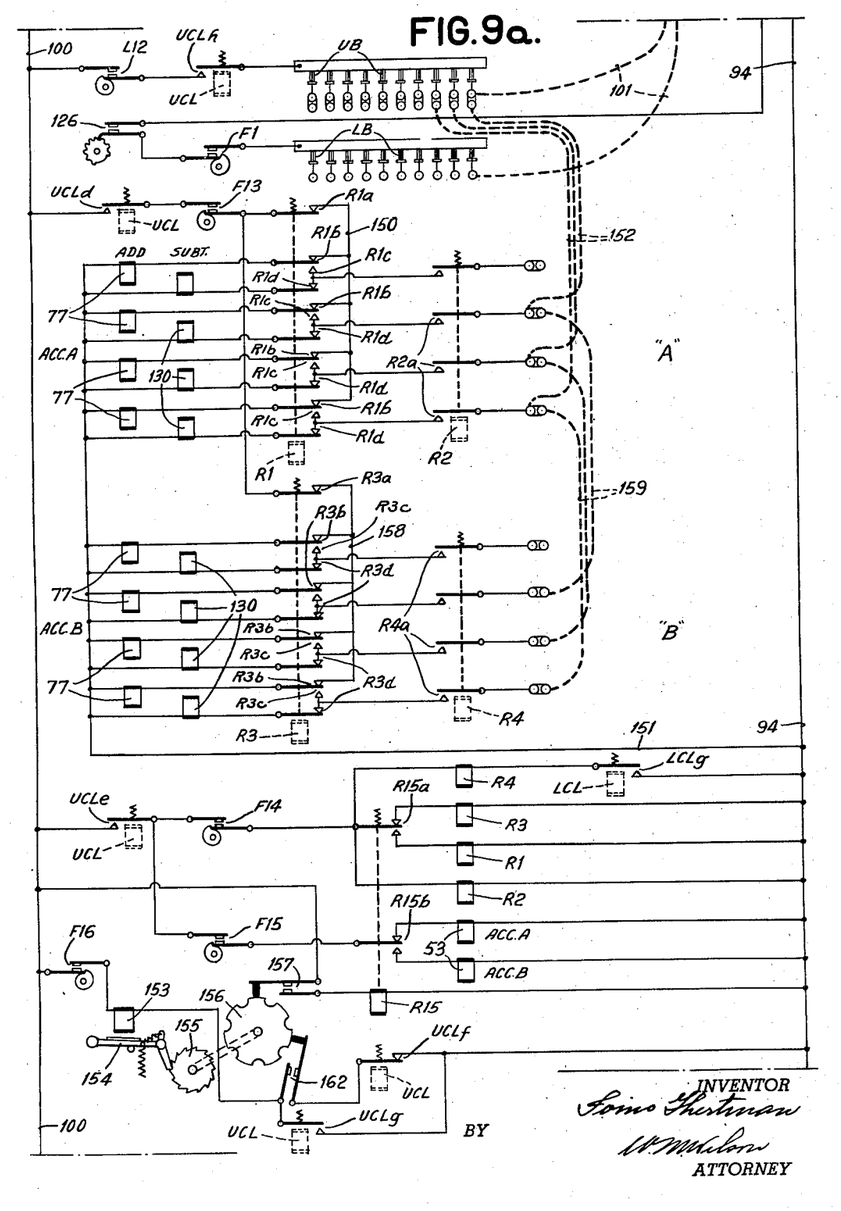
Figure 9B:
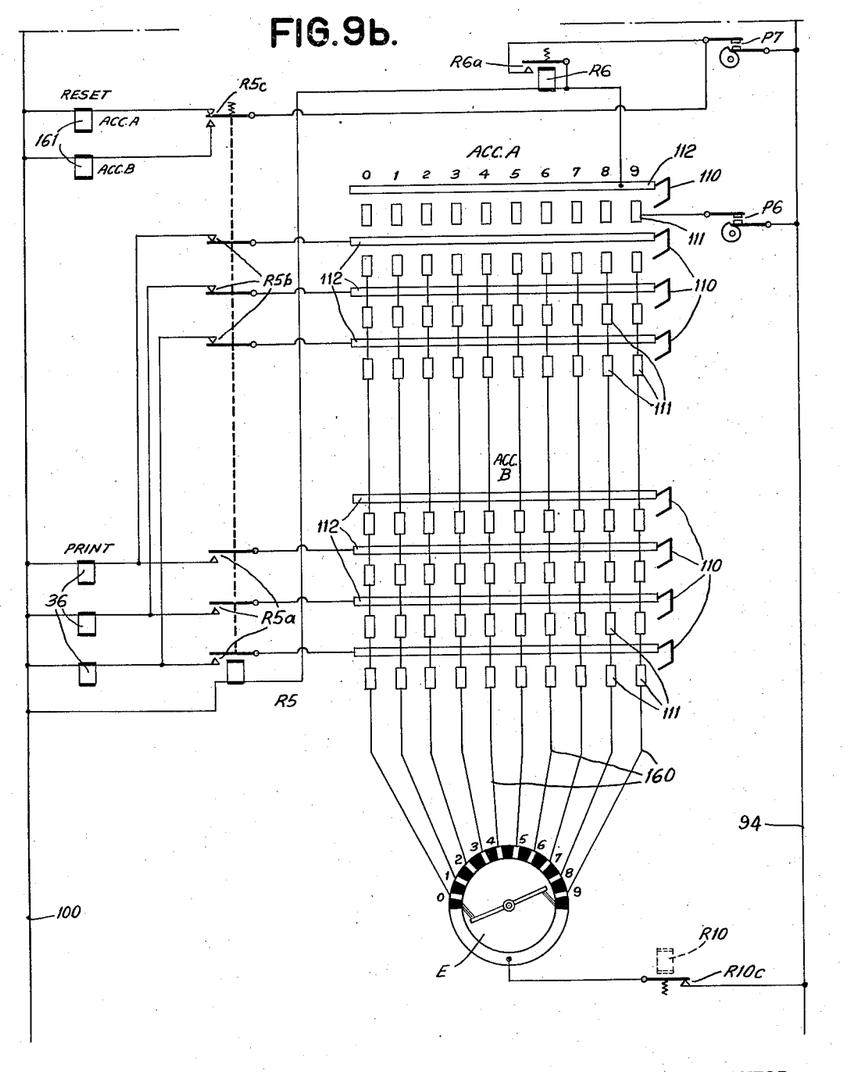

The wiring diagram of the electric circuits is shown in Figs. 9, 9a and 9b wherein the various cam controlled contact devices are diagrammatically shown and suitably labeled F, L or P for identifying as explained. The timing of these contact devices is shown in the timing diagram (Fig. 6) to which reference may be made for the time in the cycle of operation during which they function. In Fig. 6 the darkened portions represent the period during which the cam contacts are closed. Due to the several interlocking relays employed in the arrangement, it has not been advisable in all instances to show relay magnets and their associated contacts in close proximity to one another. For purposes of clarity, in the wiring arrangement the relay contact points are shown in the circuit which they control and the relay magnets are dotted adjacent thereto. Further than this, the contacts are designated with the same reference character as the controlling magnet followed by a lower case letter.

Problem

Figure 5:
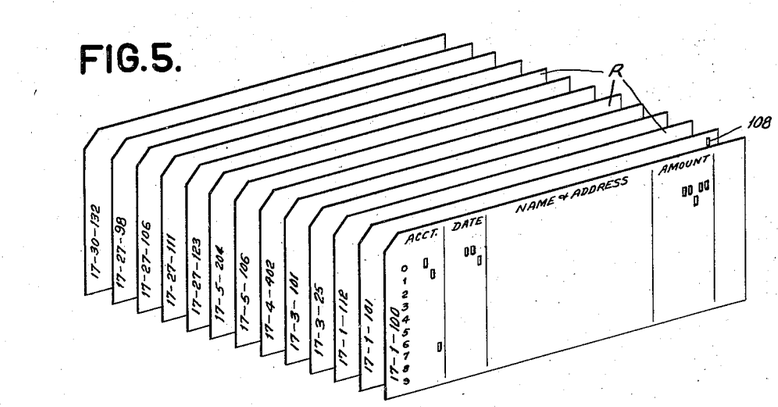
Fig. 5 is a view showing the arrangement of a representative group of record cards which are to control the operation of the machine.

The representative set of cards for controlling the operation of the machine is shown in Fig. 5 where the cards R are perforated with the same account number 17 in the left hand field and with a date in the next field. Amount representing perforations are made in the right hand field where also a special well known "X" hole may be made as indicated at 108, when the amount is a credit transaction. This group of cards represents a customer's transactions with the bank during an accounting period, and there is present a card for each day upon which a transaction occurred. Where several transactions occur on any day, there will be a number of cards for that day, each bearing the same date. These dates may run consecutively from 1 and may cover an interest period of any number of days, e. g. if the interest period be the months of January, February and March, January 1st might be designated date number 1, January 2 as date number 2, February 1 as date 32, etc. Similarly, if the interest period to be covered is for an entire year, the December 31 date might be numbered 365 in a normal year.

The present invention is concerned primarily with the sensing of the dates in the successive cards, and the explanation thereof will be confined to the features related thereto.

Figure 8:
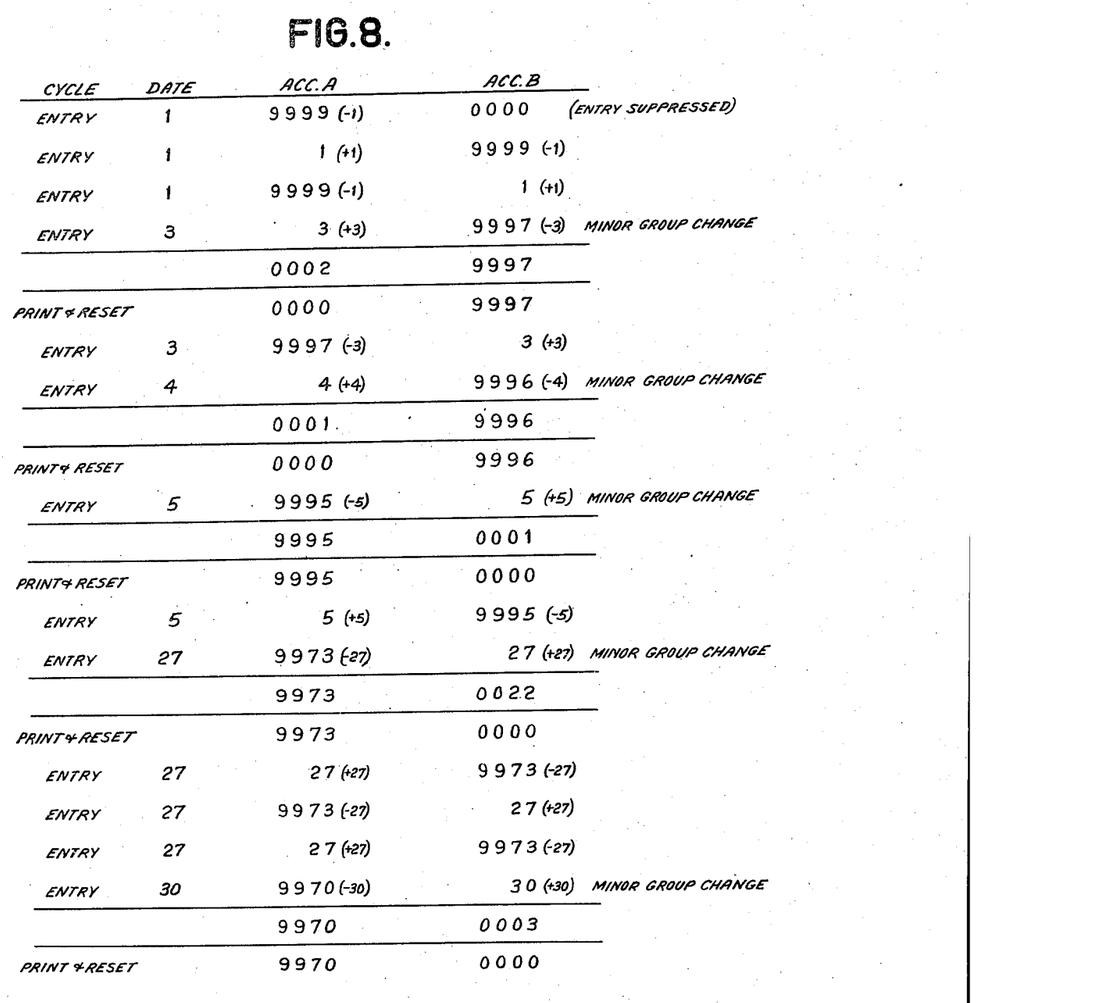
Fig. 8 is a chart depicting settings of the accumulators during the various stages of operation of the machine.

As the record cards are advanced, the date values are sensed by the first or upper set of brushes UB, and these control entries into two accumulators designated "ACC.A" and "ACC.B." In Fig. 8 there is diagrammatically represented the settings of these two accumulators in response to the sensing of the set of cards shown in Fig. 5. Accumulator A is arranged to enter the date of the first, third, fifth, etc. cards as tens complements of such dates, and to enter the dates of the second, fourth, sixth, etc. cards in their true value. Accumulator B is arranged to enter complements of the dates for the second, fourth, sixth, eight, etc. cards and to enter the true date values for the first, third, fifth, seventh, etc. cards with the exception of the very first card of the group for which entry into accumulator B is suppressed.

Thus, as indicated in Fig. 8, on the first line no entry is made in accumulator B and the tens complement of date 1 is entered into accumulator A, "1" being the date on the first card of the group. Sensing of the second card results in the entry of date 1 in accumulator A and the tens complement thereof in accumulator B. With a third card which also bears date 1 the tens complement is entered in accumulator A and the true value in accumulator B. The fourth card passing the upper brushes bears the date number 3 which is entered into accumulator A as a true value and as a complement into accumulator B. When the first card bearing date 3 has passed the upper brushes, the usual group control mechanism will detect the change in date between this card and the previous one which has just passed the lower brushes and will bring about what is commonly termed a "minor group change," whose function it is at this point to interrupt further card feeding and sensing operations and initiate other machine operations. At this time as indicated on the fifth line of Fig. 8, accumulator A stands at 2 and accumulator B stands at 9997. The amount in accumulator A represents the difference in dates between 1 and 3.

In the accounting work of banking institutions, this difference is multiplied by what is called the "daily balance" of a particular account for the day represented by the date 1, for example, to obtain what is known as a table of interest. In the copending application Serial No. 383,914 referred to there is shown mechanism for obtaining the date difference and effecting automatic multiplication operations. In the present case, multiplying devices are not shown so as not to unduly complicate the disclosure. Instead, the machine is arranged so that the difference 2 is printed upon a record sheet during the total and reset cycle following the minor group change.

During the total and reset cycle, the difference 2 is printed and accumulator A is reset while the setting in accumulator B is retained. After this cycle, card feeding resumes and the date 3 from the next card is negatively entered in accumulator A and positively in accumulator B. Following this, the card with the date 4 is sensed with the value 4 positively entered in accumulator A and negatively in accumulator B. Thus, upon the subsequent minor group change accumulator A contains the difference 1 and accumulator B contains 9996.

During the print and reset cycle, the 1 is printed from accumulator A and then this accumulator is reset. The first card having the date 5 is next sensed and entered as indicated, with a following minor group change. At this time the difference is represented in accumulator B which now controls printing and is in turn reset. Upon resumption of card feeding the second card having the date 5 is sensed, and this date is entered positively in accumulator A and negatively in accumulator B.

During the next following feeding cycle, the card having the date 27 is sensed and this date is entered negatively in accumulator A and positively in accumulator B. The minor group change is again indicated with accumulator B showing the difference 22 which is printed, and accumulator B is reset while accumulator A retains the setting 9973. Following this, the remaining cards with date 27 are sensed and entries made as indicated, and thereafter the last card has its date 30 entered and the minor group change brings about a total taking cycle, during which the difference 3 is printed and accumulator B reset.

Upon resumption of card feeding, the card with the date 30 passes the lower brushes and, since this is the last card of the group, there will be no card passing the upper brushes. As a result, there will be no entries made into accumulators A or B and the machine will stop.

*Circuit diagram*

The detailed explanation of the various circuits for handling the problem represented in Figs. 5 and 8 will now be explained in connection with the circuit diagram (Figs. 9, 9a, 9b). Current for the machine is supplied to lines designated 100 and 94 from a suitable source (not shown). In the lower part of Fig. 9 is shown the usual minor group control mechanism generally designated GC, and as is usual in tabulating machines it is first necessary to set up the minor holding relay magnets MI before the machine can be started. This is effected by depression of the reset key to close contacts 93, thereby completing a circuit from right side of line 94, wire 95, contacts 93, relay magnet R7, to line 100.

Energization of magnet R7 closes contacts R7a in the upper part of Fig. 9 which will thereupon complete a circuit from right side of 94, wire 95, stop key contacts ST, contacts R7a, relay magnet R8, contacts 102, main drive clutch magnet 103 to line 100. Energization of magnet 103 will cause coupling of the driving motor TM to the pulley shaft 6 mentioned above and will incidentally cause opening of contacts 102, whereupon relay magnet R9 will be included in the series circuit through magnet 103 and will close its contacts R9a to complete the circuit through motor TM. Contacts R8a provide a holding circuit which is traceable from the contacts, through cam contacts L1, and wire 95 to line 94. These contacts open toward the end of each cycle and at such time (when cards have been advanced) the circuit through magnet R8 is maintained through either contacts UCLa or contacts LCLa.

The relay magnet R7 energized by depression of the reset key will close a second pair of contacts R7b for completing a circuit from line 94, wire 95, cam contacts L2, contacts R7b, reset clutch magnet 70, to line 100. As explained in the mechanical description, energization of magnet 70 will effect rotation of the shaft 61 (Fig. 2) for one revolution. At this time the accumulators A and B are manually coupled to this shaft so that these accumulators are zeroized if they happen to contain entries as a result of some previous use of the machine.

During this resetting operation the P cams function, of which contacts P3 (lower part of Fig. 9) close to set up the minor control circuit. The detailed manner in which the group control mechanism functions to control the operation of the machine is well known in the art and fully set forth in Patent 1,976,617 above referred to, so that such detailed description will be unnecessary here. Suffice it to say that the date columns of the cards are plug connected for minor control as by representative plug connections designated 101 so that, upon a change in minor group classification perforations, relay magnets M1 and R10 will become deenergized.

The circuit set up during the reset cycle is traceable from line 100, contacts P3, magnets M1, R10, contacts F3, to line 94. At this time there is also a parallel circuit extending from line 100, through the relay magnets as before, but from there on branching through relay contacts LCLb, to line 94. During each card feeding cycle contacts F3 open momentarily as indicated in Fig. 6. If the device is plug connected in the usual manner for control by the perforated fields of successive cards, there will be a shunt circuit completed to maintain the magnets M1 and R10 energized. If the holes sensed disagree, there will be no shunt circuit and the magnets will become deenergized.

*Starting circuit*—With the group control set up, that is, with magnets M1 and R10 energized and with the accumulators clear, the accumulators are manually uncoupled from the reset shaft 61 for subsequent selective resetting, and the machine is in readiness to feed cards and analyze the data thereon. Depression of the start key and closure of its contacts S will complete a circuit from line 94, wire 95, start contacts S, relay magnet R13, to line 100. Contacts R13b thereupon close, completing a circuit from line 94, wire 95, contacts R10b (now closed), contacts R7c, stop key contacts STa (operable concurrently with the contacts ST), relay contacts R13b, relay magnet R14 to line 100. This circuit, it will be observed, can only be completed when the group control relay magnets are energized.

Magnet R14 will close its contacts R14a to provide a holding circuit for the magnet, and a second pair of contacts R14b in the upper part of Fig. 9 will close to complete a circuit to the card feed clutch magnet 18 so that cards will commence to feed. During the first card feed cycle, the first card will be advanced from the magazine, and with the start key contacts 93 held closed, a second card feed cycle takes place during which the first card is advanced to a position where it is just about to pass the upper brushes UB. Toward the end of this cycle, the card engages a card lever and closes the upper card lever contacts designated 99 which complete a circuit through upper card lever relay magnet UCL which in turn closes its contacts UCLc to provide a holding circuit through cam contacts L5.

Magnet UCL is energized after the group control testing contacts F3 have opened and closed again, so that the control relay magnets are still energized at the end of this card feed cycle and continued depression of the start key will cause the machine to enter upon a third card feed cycle, during which the first card passes the upper brushes UB and no card is passing the lower brushes. To prevent the group control mechanism from indicating a group change during this cycle, contacts LCLb are provided as shown in the lower part of Fig. 9 to maintain the minor control magnets energized when contacts F3 open during this card feeding cycle. Near the end of the cycle lower card lever contacts 98 close to energize lower card lever magnet LCL which opens the contacts LCLb. It is during this last card feeding cycle that entries are made from the upper brushes into accumulator A in accordance with the first line of Fig. 8. The circuits involved in effecting such entry will now be described.

*Entering tens complement of date 1 in accumulator A*—As the first card is about to pass brushes UB, cam contacts F13 (Fig. 9a) close at the "9" time, completing a circuit from left side of line 100, upper card lever relay contacts UCLd (now closed), contacts F13, relay contacts R1a, wire 150, relay contacts R1b in each denominational order of accumulator A to the adding magnets 77, wire 151, to line 94. The impulse at 9 to each of the adding magnets 77 will commence all these accumulator wheels rotating as though to enter 9's. Concurrently with the closure of contacts F13, a pair of contacts F14 also close, completing a circuit from line 100, card lever contacts UCLe, contacts F14, upper blade of relay contacts R15, relay magnet R3 to line 94. Magnet R3 opens its contacts R3a so that the 9's impulse from contacts F13 does not control accumulator B. Closure of contacts F14 also causes energization of relay magnet R2 which closes its contacts R2a so that, as a card passes the upper brushes, entering circuits will be completed to the subtracting magnets 130 of accumulator A, of which a representative circuit may be traced as follows: from line 100 (Fig. 9a), contacts L12, card lever relay magnet contacts UCLh, to the common contact roller of the upper brushes, perforation in the card, brush UB, plug connection 152, contacts R2a, contacts R1d, magnet 130, wire 151 to line 94. During this same cycle, upon closure of contacts F15 (Fig. 9a) a circuit is completed from line 100, contacts UCLe, contacts F15, upper blade of contacts R15b, magnet 53 related to accumulator A, to line 94. The magnet 53 will trip the carry lever in the units order of accumulator A, so that the elusive 1 is added to the 9 complement and, at the end of the cycle, the tens complement of date 1 will stand in accumulator A and there will be no entry in accumulator B.

*Alternating magnet control circuit*—Toward the end of the cycle, cam contacts F16 close completing a circuit from line 100 (Fig. 9a), contacts F16, magnet 153, card lever contacts UCLg (now closed), to line 94. Magnet 153 through a stepping pawl 154 advances ratchet 155 one step for each operation of the magnet. Connected to the ratchet is a disk 156 which serves to open and close contacts 157 as the disk advances. The arrangement is such that for successive steps of ratchet 155 contacts 157 are alternately opened and closed. Thus, with magnet 153 energized near the end of the last cycle ratchet 155 and disk 156 will be advanced one step, so that during the next succeeding cycle contacts 157 are closed and as a result relay magnet R15 is energized. Generally, during each odd numbered card feeding cycle contacts 157 are open and magnet R15 deenergized, while for each even numbered card feed cycle the contacts are closed and magnet R15 is energized.

*Entering date 1 of the second card*—As the second card now passes the upper brushes, the first card concurrently passes the lower brushes and the lower card lever contacts 98 are closed, so that the lower card lever magnet LCL is energized to shift its related contacts. At the beginning of this second card feeding cycle, closure of cam contacts F14 (Fig. 9a) will result in energization of relay magnet R1, through lower contacts R15a which are now shifted from the position shown. At the same time the relay magnet R2 is again energized. With magnets R1 and R2 energized, the entering circuits from the upper brushes continuing through the plug connections 152 will pass through relay contacts R2a, contacts R1c to the adding magnets 77 of accumulator A to enter the date on the card directly into the accumulator.

In accumulator B, the relay magnet R3 is deenergized for this cycle, so that the 9 impulse from contacts F13 will pass through contacts R3a, wire 158, through all the contacts R3b to all the adding magnets 77 of accumulator B. Magnet R4 is now also energized, since the lower card lever contacts LCLg are closed. This results in closure of contacts R4a, so that the circuits from the upper brushes through plug connections 152 will continue through connections 159, through contacts R4a, contacts R3d, subtracting magnets 130 of accumulator B, wire 151 to line 94. Also during this cycle closure of cam contacts F15 will complete the elusive 1 controlling circuit through the lower contacts R15b and the magnet 53 associated with accumulator B. Thus, at the end of the second card feeding cycle the date from the second card will have been positively entered in accumulator A and its tens complement in accumulator B. Near the end of the cycle cam contacts F16 again close, energizing magnet 153, so that the disk 156 advances one further step to restore the contacts 157 to their open condition with resultant deenergization of magnet R15.

*Entering date 1 from the third card*—During the now ensuing cycle, the date 1 is entered into accumulator A as the tens complement in the same manner as explained in connection with the first card. This time the true date number is entered into accumulator B, which entry was not effected for the first card. It may be pointed out that during the sensing of the first card the lower card lever relay magnet LCL was not energized, so that contacts LCLg (Fig. 9a) were open, preventing the energization of relay magnet R4 with the result that no entry circuits could be completed for accumulator B during that cycle. During subsequent cycles, however, cards will be passing the lower brushes and contacts LCLg will accordingly be closed, so that the suppression of entries into accumulator B is automatically effective only for the first date card. Thereafter, the entries will alternate as represented in Fig. 8.

*Entering date 3 from the fourth card*—As the fourth card passes brushes UB, the true value 3 will be entered in accumulator A and the tens complement in accumulator B and near the end of the cycle contacts F16 close to advance the alternating wheel 156 to prepare the circuits for alternating the entries for the next following card.

*Total print and reset cycle*—After the fourth card bearing date 3 has passed the upper brushes, the third card bearing date 1 will have passed the lower brushes and the group control mechanism will have detected the minor group change and caused deenergization of the magnets M1 and R10 (Fig. 9). As a result, the holding circuit through relay magnet R14 is broken at contacts R10b, which magnet in turn opens its contacts R14b to deenergize the card feed clutch magnet 18, so that further card feeding operations are suspended. Upon closure of contacts R10a, a circuit is completed from line 94, wire 95, contacts R10a, cam contacts L8, relay magnet R16, to line 100. Magnet R16 closes its contacts R16a so that, when contacts L2 close near the end of the cycle, a circuit is completed through contacts R16a to energize the total taking and reset clutch magnet 70. It may be mentioned here that magnet 24 is the usual printing clutch magnet which, when energized, couples the printing devices to the constantly operating driving mechanism of the machine. As shown in Fig. 9, this magnet is energized each cycle by contacts L2 so that the printing mechanism is in constant operation throughout all cycles of the machine.

*Print selecting circuits*—During this total print and reset cycle, the true difference 2 standing in accumulator A is to be printed. In the entering of dates from the several cards the difference may occur in either of the two accumulators upon a group change. For this purpose, devices are provided to determine which accumulator contains the true amount and to print from that accumulator and to suppress printing from the other. For this reason the highest order readout section of accumulator A is utilized. If the highest order wheel of accumulator A stands at 9, printing will take place from accumulator B, whereas if this highest order wheel of accumulator A stands at any other digital position than 9, printing will take place from accumulator A. For the example chosen, the highest order of accumulator A does not stand at 9 so that the several relay contacts shown in Fig. 9b remain in the positions shown. During the total print and reset cycle, the usual impulse emitter designated E rotates to complete circuits at different times for control of the printing magnets 36 in accordance with the setting of readout brushes 110. A representative circuit is traceable from line 94, contacts R10c, emitter E, the 2 wire 160, the 2 segment 111 in the lowest order of accumulator A, the brush 110 which is on this segment for the date difference 2, lowest order strip 112, relay contacts R5b, to the lowest print magnet 36 and to line 100.

If the accumulator A had contained a 9 in its highest order, then closure of cam contacts P6 at the very beginning of the total print and reset cycle would have completed a circuit from line 94, contacts P6, 9 segment 111 in the highest order, brush 110, strip 112, a relay magnet R6, magnet R5 to line 100. Magnet R6 closes its contacts R6c to provide a holding circuit for itself and magnet R5 through contacts P7 which maintains the magnet energized throughout the total print and reset cycle. As a result, contacts R5b will be opened and contacts R5a would be closed during the cycle, so that printing from accumulator A is suppressed and printing will take place from accumulator B instead, through the contacts R5a.

*Selective reset of accumulators A and B*—In Fig. 9b magnets 161 represent the usual reset magnets which, when energized during a total printing and reset cycle, will result in zeroizing their related accumulators. Contacts R5c are normally positioned so that upon closure of contacts P7 the reset magnet of accumulator A is energized. When as explained, the highest order of accumulator A contains a 9, relay magnet R5 is energized so that the contacts R5c are shifted and reset magnet 161 of accumulator B is energized instead of magnet 161 of accumulator A. Thus, the resetting is coordinated with total printing, that is, the accumulator from which printing of the date takes place is the one which is reset during the total print and reset cycle, so that at the end of the present cycle accumulator A stands at zero and accumulator B has the setting 9997 as indicated in Fig. 8.

*Entering date 3 from the fifth card*—Near the end of the reset cycle cam contacts P3 close to reenergize the minor control magnets MI and R10. Also, when contacts L8 open, relay magnet R16 is deenergized and the reset clutch magnet is deenergized. Near the end of the cycle, cam contacts P1 close to energize relay magnet R13 which, as already explained, initiates card feeding operations so that in the following cycle the card bearing the date 3 passes the upper brushes and circuits are completed therethrough to cause entry of the complement 9997 into accumulator A and the true value of the date 3 in accumulator B. A second card feed cycle follows the first, during which the date 4 on the sixth card is entered positively in accumulator A and negatively in accumulator B. At the end of such cycle the group control mechanism again detects the change and initiates the total print and reset cycle, during which, as in the prior reset cycle, it is found that accumulator A contains the true difference so that the difference 1 is printed from accumulator A and such accumulator is zeroized while the amount 9996 is retained in accumulator B. Upon resumption of card feeding, the card bearing date 5 passes brushes UB and this date is entered positively into accumulator B and negatively in accumulator A. A group change is again indicated but this time the true difference appears in accumulator B, so that relay magnet R5 (Fig. 9b) is energized and printing of date 1 takes place from accumulator B with accompanying reset thereof.

Further card feeding and total taking operations continue in the foregoing manner with all odd numbered cards having their date values entered positively in accumulator B and negatively in accumulator A, while all even numbered cards have their date values entered positively in accumulator A and negatively in accumulator B, so that upon any group change the true date difference may appear in either of the accumulators whose readout will then be automatically adjusted to print from the proper accumulator.

*Major group change*—When the last card having date 30 passes the upper brushes, it will control entries just as the previous cards and, after this card has advanced to the lower brushes, a minor group change is indicated, following which total printing from accumulator B takes place as indicated in Fig. 8 and accumulator B is reset. After this last card has passed the upper brushes, the upper card lever contacts 99 open and later in the cycle, when contacts L5 open, the upper card lever magnet UCL becomes deenergized after the group control testing contacts F3 have opened and closed again. Thus, when contacts P1 close, contacts UCLb are open so that card feeding does not resume automatically. Start key contacts S may now be manually closed to resume card feeding but there will now be no card passing the upper brushes. While the last card passes the lower brushes, no entries will be made in accumulators A and B and, upon the opening of group control testing contacts F3, magnets MI and R10 will become deenergized. The movement of the last card past the lower brushes will cause opening of lower card lever contacts 98 and consequent deenergization of the lower card lever relay magnet LCL. With both card lever contacts UCLa and LCLa open, the holding circuit through the main drive clutch 103 is broken and the machine will stop.

To simplify the disclosure, it has been assumed that only one set of cards, all of the same account number, are passed through the machine at a time. With this arrangement a further set of customer's cards may be placed in the magazine, and preliminary operations as described are carried out to first clear the accumulators and advance the first card in the new set to the upper brushes. Depending upon the number of cards contained in a prior group or set of cards, the alternating wheel 156 (Fig. 9a) may be in either of its alternate positions when a new group is fed into the machine. For the proper operation, the relay magnet R15 is required to be deenergized when the first card of a new set passes the upper brushes. In order to insure that the magnet is deenergized, a pair of contacts 162 is provided, which cooperate with the periphery of wheel 156 and if, after the sensing of the prior set of cards the wheel were in position to close contacts 157, the contacts 162 would also be closed.

During the first preliminary card feed cycle, closure of cam contacts F16 will complete a circuit from line 100, contact F16, magnet 153, the contacts 162, normally closed card lever relay contacts UCLf to line 94. This would step wheel 156 ahead to open contacts 157 and also 162. As soon as cards arrive at the upper brushes, contacts UCLf will be opened to disable the effectiveness of contacts 162. At the same time contacts UCLg will close so that the wheel 156 will be advanced a step for each card feeding operation thereafter, and the contacts 157 open during the sensing of the odd numbered cards and close during the sensing of the even numbered cards.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine controlled by record cards containing designations representing dates, said cards being arranged in order of successive dates, said machine having card feeding mechanism, upper and lower sensing brushes past which the cards are fed in succession by said card feeding mechanism, group control mechanism, printing devices and resetting devices, said group control mechanism being responsive to said brushes when cards concurrently passing both brushes are unlike in date values for interrupting operation of the card feeding mechanism, initiating and effecting an operation of said printing and resetting devices and then causing resumption of card feeding, in combination with a pair of accumulators, entering means for each, for entering amounts into their respective accumulators directly or in the form of complements, cyclically operable means coordinated with the card feeding mechanism for rendering the entering means of one accumulator effective for direct entries and the entering means of the second accumulator effective for complemental entries during one cycle and for rendering the entering means of said one accumulator effective for complementary entries and the entering means of the second accumulator effective for direct entries during the next cycle, said sequence of operations continuing as long as the card feeding mechanism remains in operation, means controlled by the upper sensing brushes in response to the sensing of date designations on each card for causing the entering means of both accumulators to enter the date into both accumulators, directly in one and complementarily in the other, means for controlling the operation of the entering means to cause suppression of the direct entry for the first card of a run, means effective upon operation of said group control mechanism for determining which accumulator contains a complementary value and means controlled thereby for selectively causing the printing devices to print from and the resetting devices to reset the accumulator containing the true value.

2. In a machine controlled by record cards containing designations representing dates, said cards being arranged in order of successive dates, said machine having card feeding mechanisms, upper and lower sensing brushes past which the cards are fed in succession, by said card feeding mechanism, group control mechanism, further operation controlling devices, said group control mechanism being responsive to said brushes when cards concurrently passing both brushes are unlike in date values for interrupting operation of the card feeding mechanism, initiating and effecting an operation of said further operation controlling devices and then causing resumption of card feeding, in combination with a pair of accumulators, entering means for each, for entering amounts into their respective accumulators directly or in the form of complements, cyclically operable means coordinated with the card feeding mechanism for rendering the entering means of one accumulator effective for direct entries and the entering means of the second accumulator effective for complemental entries during one cycle and for rendering the entering means of said one accumulator effective for complementary entries and the entering means of the second accumulator effective for direct entries during the next cycle, said sequence of operations continuing as long as the card feeding mechanism remains in operation, means controlled by the upper sensing brushes in response to the sensing of date designations on each card for causing the entering means of both accumulators to enter the date into both accumulators, directly in one and complementarily in the other, means for controlling the operation of the entering means to cause suppression of the direct entry for the first card of a run, means effective upon operation of said group control mechanism for determining which accumulator contains a complementary value and means controlled thereby for causing the further operation controlling devices to be controlled in accordance with the amount standing in the accumulator containing the true value.

IOINO GHERTMAN.